(12) United States Patent
Kaplan et al.

(10) Patent No.: US 8,473,219 B2
(45) Date of Patent: Jun. 25, 2013

(54) COMPUTATIONAL METHOD FOR GENERATING A FEEDING SCORE FOR AN INDIVIDUAL INFANT

(75) Inventors: Joel Kaplan, Philadelphia, PA (US); Jay N. Zemel, Jenkintown, PA (US); Barbara Medoff-Cooper, Bala Cynwyd, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 547 days.

(21) Appl. No.: 12/595,755

(22) PCT Filed: Apr. 14, 2008

(86) PCT No.: PCT/US2008/004873
§ 371 (c)(1),
(2), (4) Date: Oct. 13, 2009

(87) PCT Pub. No.: WO2008/127733
PCT Pub. Date: Oct. 23, 2008

(65) Prior Publication Data
US 2010/0131454 A1    May 27, 2010

Related U.S. Application Data

(60) Provisional application No. 60/911,539, filed on Apr. 13, 2007.

(51) Int. Cl.
*G01N 33/48*    (2006.01)

(52) U.S. Cl.
USPC .......................................................... 702/19

(58) Field of Classification Search
None
See application file for complete search history.

(56) References Cited

U.S. PATENT DOCUMENTS

| 4,232,687 | A | 11/1980 | Anderson-Shanklin |
| 6,033,367 | A | 3/2000 | Goldfield |
| 2001/0044588 | A1* | 11/2001 | Mault ............................ 600/549 |
| 2004/0177101 | A1 | 9/2004 | Underwood |
| 2005/0175759 | A1 | 8/2005 | Singhal |
| 2006/0129127 | A1 | 6/2006 | Ruth et al. |

OTHER PUBLICATIONS

Gewold et al. (Developmental Medicine & Child Neurology, vol. 43, p. 22-27, 2001).*
Mizuno et al. (Developmental Medicine & Child Neurology, vol. 47, p. 299-304, 2005).*
Lau et al. (Dysphagia 16:58-67, 2001).*
International Search Report dated Jul. 17, 2008.

* cited by examiner

*Primary Examiner* — Pablo S Whaley
(74) *Attorney, Agent, or Firm* — RatnerPrestia

(57) ABSTRACT

A computational method for generating a feeding score for an individual infant based upon a comparison of feeding factor measurements obtained from the individual infant, values associated with the feeding factor measurements, and feeding parameter metrics from a population of infants having a similar gestational age as the individual infant.

3 Claims, 3 Drawing Sheets

COMPUTATIONAL METHOD FOR GENERATING A FEEDING SCORE FOR AN INDIVIDUAL INFANT

This application is a National Phase application of PCT/US2008/004873, filed Apr. 14, 2008 which claims priority from U.S. Provisional Application No. 60/911,539 the contents of these applications are incorporated herein by reference.

FIELD OF THE INVENTION

This invention relates to a method and system for evaluating infant feeding performance. More particularly, the invention relates to a method and system for evaluating infant feeding performance involving the processing of digitized data corresponding to an individual infant's responsiveness during one or more bottle-feeding tests.

BACKGROUND OF THE INVENTION

In the United States, nearly four million infants are born each year, with a large fraction (including more than 500,000 pre-term deliveries) at risk for under-developed feeding performance levels at the time of hospital discharge, and for medically significant feeding problems after discharge. Assessment and analysis of feeding performance as an infant approaches readiness for hospital discharge is widely recognized as very important for discharge timing, and as one prospective indicator of medical and developmental progress (or problems) in the weeks after discharge, as well as in later infancy. Yet, in common practice, infant feeding assessment is most often highly subjective, with substantial variability of practices across neonatal nurseries. The lack of an objective and quantitative standard for feeding assessment is a particular concern for "challenged infants", including premature infants, i.e., those born before completion of the $37^{th}$ gestational week. Feeding in infants born very prematurely (at 34 weeks gestational age [GA] and earlier) is monitored carefully at early stages, during which feeding therapy is often administered to promote safe acquisition of rudimentary feeding skills. However, feeding performance of the same infants often receives much less attention as hospital discharge nears despite the fact that their feeding skill level at this time, on average, is significantly weaker than that of infants delivered at term. The consequences of inadequate screening bear most heavily on those pre-term infants whose feeding skills fall below, or well below their group average. Thus, a physician may discharge some infants not knowing they may be incapable of independent oral feeding, and marginal feeders may be discharged without appropriate notation of feeding status in the discharge plan. Infant feeding problems often carry forward after discharge, contributing in part to high hospital readmission rates for premature infants (20-25% vs. 1-3% for full-term infants), and contributing to high usage rates for other medical services (including acute care visits, non-routine physician visits, and feeding therapy) related directly or indirectly to poor feeding performance. It is likely that the associated economic, social and familial burdens can be reduced by systematic and standardized evaluation of feeding performance before and after hospital discharge in order to better identify of those infants at greatest risk for adverse outcomes, who would benefit from preventive or ameliorative interventions.

Current techniques for assessing feeding performance of full-term infants with uneventful deliveries are cursory, non-quantitative and subjective. For example, a typical assessment involves (1) "the finger test" where a finger is inserted into the infant's mouth to determine if the infant produces an adequate amount of negative sucking pressure, (2) observing whether the infant orients to a nipple stroked against the perioral region, and (3) observing that a salient amount of milk or formula is ingested (but with no standard guideline for an acceptable amount). Such techniques do not provide a quantitative or objective assessment of the infant's feeding performance. In fact, two people performing the same observations on the same infant may reach different conclusions about the infant's feeding ability.

With notable exceptions, most infants born prematurely receive feeding evaluations hardly more systematic than that described above when they approach readiness for hospital discharge; that is, after the primary medical comorbidities of pre-term delivery (e.g., apnea of prematurity) have been resolved or ameliorated, and after a few days of observation, referred to as the "margin of safety," beginning when the infant first meets criteria for physiological maturity. Nevertheless, some infants do receive much greater attention to their feeding status during the latter portion of the hospital stay. These include those not feeding independently according to the cursory assessment, and early pre-term infants who were not candidates for, or were not responsive to, prior efforts to promote feeding skill acquisition. In these cases, services of a specialist (e.g., a speech-language pathologist, or an occupational therapist or nurse with appropriate training) are often ordered, which may include administration of standard diagnostic tests (e.g., a fluorographic swallow study to detect morphological anomalies or the oropharynx), and a thorough evaluation of feeding performance. Unfortunately, however, such feeding assessment methods have not been standardized, and a mosaic of practices and procedures are currently employed. One example is the Neonatal Oral Motor Assessment Scales, a lengthy protocol involving completion of numerous tests, and visual evaluation of sucking rhythmicity and of coordination between sucking, swallowing and breathing movements. NOMAS must be performed by trained, certified raters, and inter-rater reliability remains an issue. Another protocol employs instrumentation to record negative sucking pressure, and expression pressure (i.e., squeezing pressure applied to the nipple) during bottle-feeding tests. From these records, the infant receives a "sucking maturity" rating according to a five-point scale. Here, objective records are provided, but the assessment involves visual inspection, selection of record segments deemed representative of overall feeding performance, and categorical assignments based on the judgment of a trained rater. Shortcomings of these and related assessments include (1) limited extent of current clinical use, (2) biases related to a significant measure of rater subjectivity, (3) lengthy test duration, (4) expense associated with professional assessors.

Notwithstanding conventional practices for assessing infant feeding performance, devices for quantitatively measuring certain parameters related to infant feeding are known. For example, U.S. Pat. No. 3,895,533 (Steier) discloses a device resembling a baby bottle for measuring the negative sucking pressure of an infant to determine if the baby has a relatively poor sucking ability. U.S. Pat. No. 4,232,687 (Anderson-Shanklin) discloses a feeding nipple apparatus for measuring the negative sucking pressure and expression pressure that an infant exerts on a test nipple. The purported purpose of this apparatus is to measure an infant's (in particular a premature infant's) capacity to bottle feed in order to mitigate the risk of regurgitation or milk aspiration. Another device is shown in U.S. Pat. No. 6,033,367 (Goldfield) which discloses a system for diagnosing and/or monitoring sucking, swallowing, and breathing competence of an impaired neonate or postoperative infant. The system of Goldfield involves sensors for measuring negative sucking pressure and breathing rate as well as an automated valve and computerized feedback loop to control the amount of fluid flowing through a feeding nipple to an infant as a function of the infant's negative sucking pressure and breathing rate.

Each of the aforementioned publications discloses a means for measuring particular factors that are related to an infant's feeding performance, but most, however, link a measurement device with specific protocols focused on improving feeding performance (particularly in relation to initial acquisition of feeding skills), and none disclose a quantitative method suitable for broad-based diagnostic screening; that is, they do not disclose a method of evaluating the feeding performance of an infant that involves comparing feeding performance data of a single infant to an objective standard, such as a metric derived from a population-based sample of infants.

The clinical research literature contains a number of studies in which infant feeding performance is characterized and analyzed. Examples of feeding parameters analyzed include the number of sucks in a test session, duration of sucking bursts, and relationship between sucking and breathing rhythms. These studies, however, generally treat a small number of specific parameters of interest, and emphasize statistical evaluation of differences in feeding performance between groups of selected interest, of effects of a clinical treatment or intervention on feeding performance, or of changes in feeding performance as a function of time, maturation or experience. Such research has not focused on individual subject differences in feeding performance except as relevant to subject variance for specific statistical analyses, or in relation to subject differences in response to specific experimental variables. Not provided, then, are methods for scaling feeding performance of individual infants in relation to population-based norms, or methods suitable for a broad-based screening instruments for assess an infant's risk for adverse outcomes related directly or indirectly to poor feeding performance.

Thus, there remains a need for a quantitative and objective means for assessing the feeding performance of an infant, and for scaling said performance in relation to population-based norms and, ideally, to risk for adverse outcomes. The present invention satisfies this need among others.

SUMMARY OF THE INVENTION

Applicants have devised a method for computing a relative score indicative of an individual infant's feeding performance based, at least in part, upon a comparison of one or more feeding factor measurements of the individual infant with one or more among a predetermined set of metrics derived from a population-based sample. The method also provides a statistical association between normative metric values and adverse outcomes recorded for the same population-based sample and, thereby, a means for assessing the tested infant's risk for said adverse outcomes. Thus, the invention disclosed herein addresses, among other issues, the current screening gap for infants at the time of initial discharge from the hospital by providing a method and system for automated analysis of an infant's feeding performance during a brief test delivered by an adult (e.g., a nurse) with no specialized training, and of the infant's performance scaled in relation to normative ranges derived from a population-based sample of infants appropriately matched with respect to gestational age at birth, age at the time of testing, and the like.

Accordingly, one aspect of the invention provides a method for evaluating the feeding performance of an infant comprising receiving an input of digitized data corresponding to measurements of at least one feeding factor generated during at least one feeding session for an individual infant; calculating a value for a feeding parameter from said digitized data; corresponding said value to a feeding parameter metric to derive a referenced feeding score; and providing said referenced feeding score as a user-recognizable output.

According to another aspect of the invention, provided is a method for assessing a medically relevant condition of an infant comprising: receiving an input of digitized data corresponding to measurements of at least one feeding factor generated during at least one feeding session for an individual infant; calculating a value for a feeding parameter from said digitized data; corresponding said value to a risk outcome metric to derive a referenced risk outcome score; and providing said referenced risk outcome score as a user-recognizable output.

According to yet another aspect of the invention, provided is a system for evaluating the feeding performance of an infant comprising: a database comprising at least one feeding parameter metric; a data interface for receiving digitized data corresponding to measurements of at least one feeding factor generated during at least one feeding session of an individual infant; a microprocessor in electronic communication with said data interface and said database, wherein said microprocessor is programmed to (i) calculate at least one value for at least one feeding parameter from said digitized data; (ii) correspond said value to said at least one feeding parameter metric to derive at least one referenced feeding score; and at least one output device selected from the group consisting of visual display, printer, output data port, RF transmitter, and digital medium storage device, wherein said output device is in electronic communication with said microprocessor.

According to yet another aspect of the invention, provided is a system for assessing a medically relevant condition of an infant comprising: a database comprising at least one risk outcome metric; a data interface for receiving digitized data corresponding to measurements of at least one feeding factor generated during at least one feeding session of an individual infant; a microprocessor in electronic communication with said data interface and said database, wherein said microprocessor is programmed to (i) calculate at least one value for at least one feeding parameter from said digitized data; (ii) correspond said value to said at least one risk outcome metric to derive at least one referenced risk outcome score; and at least one output device selected from the group consisting of visual display, printer, output data port, RF transmitter, and digital medium storage device, wherein said output device is in electronic communication with said microprocessor.

According to yet another aspect of the invention, provided is a method for producing a metric database comprising: receiving an input of digitized data corresponding to measurements of at least one feeding factor obtained from each infant in a population-based sample of infants; calculating a value for said feeding parameter for each said infant from said digitized data; receiving an input of medical history data for each said infant; receiving an input of medical outcome data from each said infant; structuring said values for said feeding parameter and said medical history data and said medical outcome data into a collection of electronic records; deriving distribution statistics for said values and data from said sample of infants; deriving statistical relationships between a feeding parameter and medical outcome data; referencing feeding parameter values or value ranges to an estimated risk of a medical outcome; structuring results of said deriving and referencing operations into a collection of electronic records; and storing all said electronic records in a computerized database system.

DETAILED DESCRIPTION OF PREFERRED EMBODIMENTS OF THE INVENTION

Figure 1:
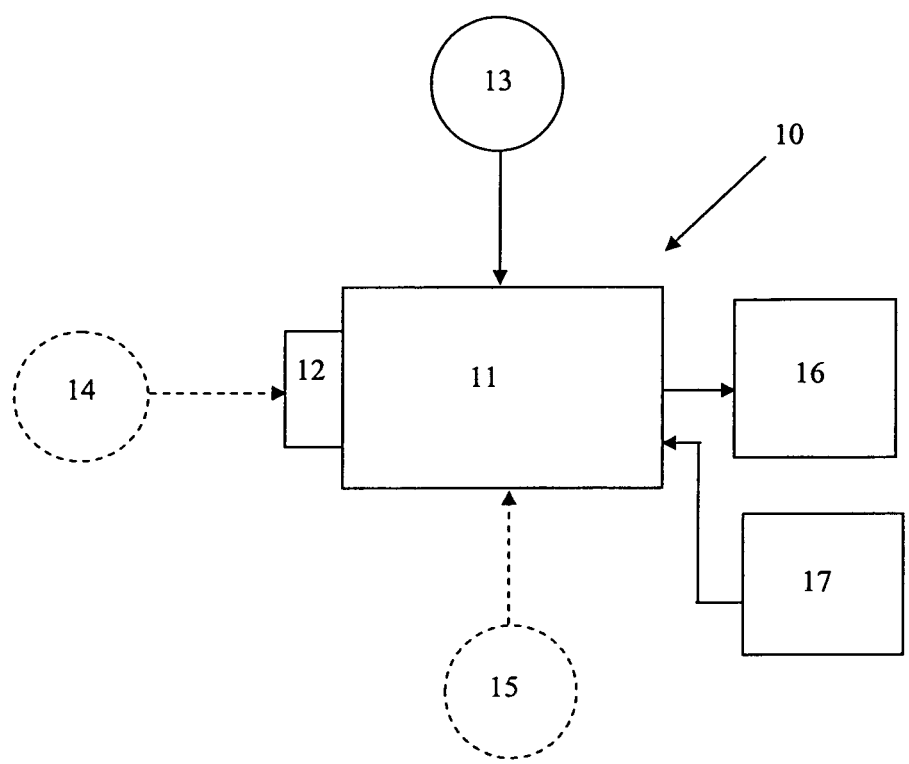
FIG. 1 shows an embodiment of a system for evaluating the feeding performance of an infant according to the present invention.

In certain preferred embodiments of the invention, provided is a method for evaluating the feeding performance of an infant that involves receiving an input of digitized data corresponding to measurements of at least one feeding factor generated during at least one feeding session of an individual infant. The digitized data is converted into at least one value for at least one feeding parameter, which in turn is used to compute a referenced feeding score for the infant based upon a comparison with a corresponding feeding parameter metric, or a referenced risk outcome score for the infant based upon a comparison with a corresponding risk outcome metric. The referenced feeding score and/or referenced risk outcome score is then provided as a user-recognizable output.

As used herein, the term "feeding performance" means an infant's innate or acquired capacity for orally feeding via a synthetic nipple, expressed as physical, physiological and/or behavioral responses during a feeding session.

As used herein, the term "infant" means a human child from age birth to about one-year old.

As used herein, the term "feeding factor" means one or more physical, physiological, and/or behavioral responses produced or exhibited by an infant while orally feeding or attempting to orally feed. Examples of feeding factors include sucking pressure, expression pressure, oxygen saturation level, swallowing, respiration, and the like.

As used herein, the term "feeding session" means a continuous period of time during which an infant is provided with a feeding device, such as a baby bottle, and is encouraged to feed from the device. The feeding session may be a function of a predetermined period of time, a predetermined consumption volume, or both. The feeding session also can be subdivided into two or more epochs to further quantify the feeding performance of an infant. Feeding sessions also can be subdivided in relation to one or more events or markers such as an instance of particular behavior demonstrated by the observed infant.

As used herein, the term "feeding parameter" means a variable derived from a composing function, such as a summation operation or a statistical operation, performed on an aggregation of a feeding factor event and its related features. Statistical operations can include, for example, composing/calculating/computing a mean, mode, standard deviation, variance, and the like.

As used herein, the term "event" with respect to feeding factor means a detected change in values associated with a feeding factor, such the pressure changes measuring during a suck cycle.

As used herein, the term "features" with respect to event means a quantitative descriptor of the excursion of the event from a baseline. Examples of features include time of the event, peak value of the event, duration of the excursion, area under the curve, and the like.

As used herein, the term "aggregation" with respect to an event and its features means an event and its features characterized over a time interval and/or as a temporal relationship to linked events. Linked events can include two or more different factors.

As used herein, the term "referenced feeding score" means a quantitative value that is derived by comparing the value of a feeding parameter from a feeding session of an observed infant to a corresponding feeding parameter metric. Examples of referenced feeding scores include an observed parameter value expressed as a percentile or percentile range within the distribution of values comprising the feeding parameter metric.

As used herein, the term "referenced risk outcome score" means a quantitative value that is derived by comparing the value of a feeding parameter from a test session with an observed infant to a corresponding risk outcome metric.

As used herein, the term "feeding parameter metric" means a set of values for a feeding parameter that has been derived from feeding sessions from a population-based sample of infants, a set of descriptive statistics for the distribution of said sampled values including the sample mean, mode standard deviation and the like, and at least one referencing operation relating each value or value range to its position relative to the sample distribution yielding its corresponding z-score, the percentage of sampled values greater than said referenced value, and the like.

As used herein, the term "risk outcome metric" means a set of values for a feeding parameter that has been derived from a population-based sample of infants; a set of values for one or more medically relevant outcomes derived from said population-based sample; results of one or more statistical evaluations of the strength of association between said feeding parameter and said outcome(s); at least one referencing operation relating each feeding parameter value or value range to: (i) a corresponding expected outcome which can be given as an average sampled outcome value associated with said feeding parameter value or value range, the percentage of sampled values associated with greater outcome values, and the like, and (ii) one or more estimate of statistical confidence associated with the expected outcome, including a confidence interval, standard error of the estimate, and the like.

As used herein, the term "user-recognizable output" means a manifestation of an output produced by a microprocessor that is readily perceived visually or audibly by a human user or as digital information readable by a computer or database user.

As used herein, the term "medically relevant condition" means a present or imminent risk of a medical problem directed related feeding, such as poor feeding, aspiration, and the like; or indirectly related to feeding, such as abnormal neurological function.

As used herein, the term "medically relevant outcome" means a medically relevant condition that may be experienced by an infant in the weeks after hospital discharge as well as adverse outcomes that may emerge or be detected later in infancy.

Digital data useful in the present invention includes, for example, collections of digitized outputs from a device that converts physical quantities into measured values. Examples of such physical quantities include pressure and time, such as the interior pressure of a baby bottle, while an infant is feeding from the bottle. Such data is typically characterized as per a feeding session.

In certain preferred embodiments, receiving an input of digitized data involves downloading data from a measuring device in real time or approximate real time during an infant feeding session. In certain other preferred embodiments, receiving an input of digitized data involves downloading stored data that is compiled for one or more feeding sessions. Before being downloaded, the compiled data preferably resides in an electronic data storage medium, such as a flash memory chip. In certain preferred embodiments, the data is produced by a hand-held instrument, such as a baby bottle equipped with a pressure sensor for monitoring pressure inside the bottle, analog-digital convertor, a microcontroller, and a flash memory chip. The device is provided to an infant during a feeding session. As the infant feeds, a signal from the sensor is converted into a digital signal at a predetermined sample rate. A microcontroller converts this digital signal into digital data which is preferably stored on a memory chip until it is downloaded.

The means of receiving the digitized data is not particularly limited, provided that the data transfer is efficient and accurate. In certain preferred embodiments, the receiving step involves receipt of a wireless data signal. In other embodiments, the receiving step involves receipt of a data signal via a wired connection.

One or more feeding parameters are rendered from the received digitized data, in part or in its entirety, so as to bring out the meaning of the data as it relates to an infant's feeding performance during a feeding session. More particularly, feeding parameters are obtained by detecting an event, computing the features of the event, aggregating the event and its features, and then performing a composing function on the aggregation to render a feeding parameter. Feeding parameters include both primary parameters as well as composites of two or more parameters.

Examples of feeding parameters for a particular feeding session include, but are not limited to, number of sucks, average pressure peaks for all suck events, average number of sucks per sucking burst, total burst time as a percentage of the observation interval, mean, variance and coefficient of variation of time intervals between sucking pressure peak and peak inspiration (i.e., inhalation), and breathing rate during sucking bursts.

Calculating of values for feeding parameters preferably involves executing a set of instructions that calculate a value the desired parameter based upon the received data. In certain preferred embodiments, the instructions are in the form of an executable computer program, i.e. software or firmware. For such embodiments, the computing step involves the use of a microprocessor or other automated computational device. The type of programming languages and/or paradigms that are useful with the present invention are not particularly limited, provided that the software can performed the desired functions on the chosen computer platform.

Generating a referenced infant feeding score preferably involves associating a feeding parameter value for an individual infant to a corresponding feeding parameter metric, for example by matching the value of the feeding parameter of the individual under observation to a similar value, position, or form within the feeding parameter metric. Generation of a referenced risk score likewise involves associating a feeding parameter value for an individual infant to a corresponding risk outcome metric. By comparing the data collected on an individual infant to a standard value or range, or by specifying the relationship between the parameter value and a medical condition or risk for adverse outcomes, an objective, quantitative evaluation of the infant's feeding performance is obtained. In certain preferred embodiments, the corresponding step involves comparing the value of the feeding parameter to the closest value of the metric to determine a quantitative referenced feeding score for the individual infant.

Preferably, the feeding parameter metric of interest, the risk outcome metric of interest, or both reside within a database as a set of feeding parameter data collected on a population-based sample of infants, a referencing operation, and preferably, a set of subject characteristic data collected on the sample of infants. In certain embodiments, the database comprises a plurality of feeding parameter metrics and/or a plurality of risk outcome metrics. In certain embodiments, the metric may comprise a plurality of zones, percentile ranges, and/or cut point values. Preferably, the database involves a computerized database. The type of computerized database useful in the present invention is not particularly limited provided that it is capable of storage and retrieving electronic data.

Preferably, the feeding parameter values for the infant of interest and data sets of desired metrics are arranged in an array, such as a matrix, to assess the correlation between the feeding parameter value and the metric data. The cumulative result of these correlations preferably is used to generate a medically relevant outcome metric.

The method preferably involves providing the referenced feeding score and/or referenced risk outcome score as a user-recognizable output. In certain preferred embodiments, this step comprises displaying the relevant output as text on an electronic display, as an illuminated LED, and the like.

The population-based sample of infants from which the feeding parameter metric is obtained preferably includes infants having similar characteristics to the infant under evaluation. Ideally, the sample is comprised of infants with about the same gestational age at birth as the observed infant, and at a similar age at the time of the feeding test session. For example, if the observed infant has a gestational age at birth of 32 weeks with the evaluation performed at 35 weeks gestational age, the infants in the sample from which the metric is generated are born near 32 weeks of gestational age and tested at a time near 35 weeks gestational age. In addition to gestational age at birth, other characteristics that are useful in considering similarities between the observed infant and the metric population include the genetic abnormalities, presence or absence of medical complications attending delivery, infants' medical history between birth and testing, maternal characteristics such as age and medical status, and the like. Using a metric derived from a population-based sample of infants with appropriately matched characteristics facilitates an accurate interpretation of the referenced feeding score by medical professionals. The size of the sample is not particularly limited, but should include at least 30 individuals, and more preferably, a number large enough to accurately specify intercorrelations among feeding parameter metrics, and to provide adequate statistical power for detecting, and evaluating the strength of, associations between feeding parameter metrics and medically relevant outcome metrics where such associations exist.

The referenced feeding parameter scores and the referenced risk outcome scores generated for an infant of interest can be used as a diagnostic and/or prognostic aide. For example, feeding parameter scores can be used by a physician or other professional to determine the feasibility of discharging an infant from a hospital after birth. In certain embodiments, a single score is determinative of a medically relevant condition, while in other embodiments, the cumulative result of a plurality of scores are determinative.

Medically relevant outcomes include adverse outcomes that may be experienced by an infant in the weeks after hospital discharge as well as adverse outcomes that may emerge or be detected later in infancy. Examples of the former include hospital readmission, emergency room admission, emergency room observation, non-routine assessment by a pediatrician, need for feeding therapy, high degree of parental anxiety about infant feeding performance, and the like. Examples of outcomes that may be observed later in infancy include delayed cognitive and psychomotor developmental (as assessed by the Bayley Scales of Infant Development (BSID-II) or similar instrument), feeding problems associated with transition from fluid to semi-solid or solid forms of nutrition, failure to thrive, diagnosis and/or prognosis of a disease, diagnosis of a bodily injury, and the like.

Figure 2:
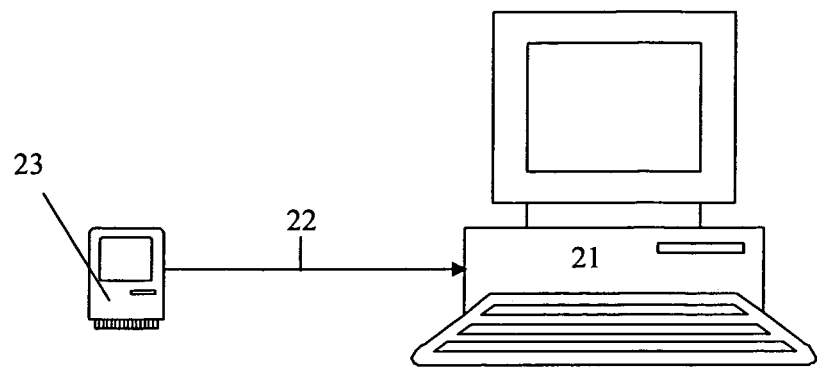
FIG. 2 shows an embodiment of a system for evaluating the feeding performance of an infant according to the present invention, wherein the system receives the raw data from a data storage device.
Figure 3:
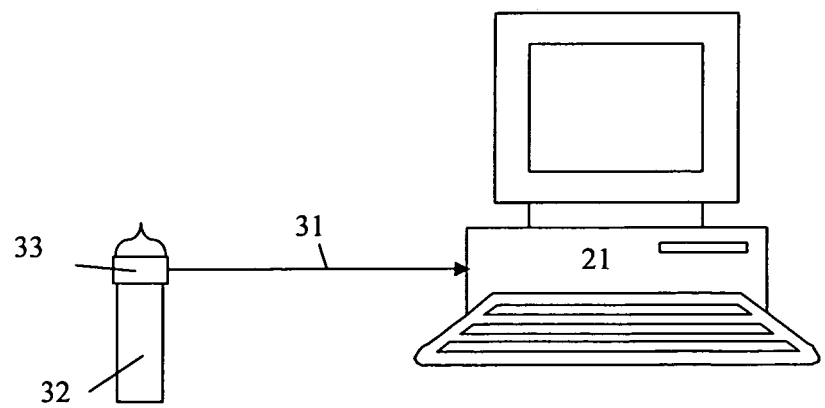
FIG. 3 shows an embodiment of a system for evaluating the feeding performance of an infant according to the present invention, wherein the system receives the raw data from a measuring device.

Turning now to FIGS. 1-3, shown is a system for evaluating the feeding performance of an infant according to certain preferred embodiments of the invention.

The system 10 of FIG. 1 comprises a data interface 12 for receiving digital data 14 corresponding to measurements of at least one feeding factor generated during at least one feeding session of an individual infant; a microprocessor 11 programmed with instructions 13 to compute (i) at least one value for at least one feeding parameter from said raw digitized data 14 and (ii) rendering a referenced infant feeding score for said individual infant, wherein said rendering involves a comparison of said feeding parameter value to a feeding parameter metric 15; and at least one output device 16 selected from the group consisting of visual display, printer, output data port, RF transmitter, and digital medium storage device. Preferably, the microprocessor is integrated into printed circuit board which may also include memory, input/output lines, and ancillary processors and components. In certain preferred embodiments, the system also comprises an input device 17, such as a push-button, keyboard, mouse, touch screen, microphone, or the like.

As shown in FIG. 2, in certain embodiments the digital data 14 can be received by the system 21 from a digital data storage medium, such as semiconductor memory 23. In such systems, the data interface is preferably a data port (not shown), such as a USB port, wireless port, etc., through which data can be electronically transferred 22.

As shown in FIG. 3, in certain embodiments the digital data 14 can be received by the system 21 from an instrument 33 attached to a baby bottle 32 or other feeding device that directly measures the desired physical and/or chemical quantities, and converts such measurements into digital data. In such systems, the raw data is transferred 31 as a wireless RF or electronic signal and is received by the system via a data interface (not shown). Examples of such data interfaces include data ports, such as a USB port, or an RF receiver capable of detecting and converting an wireless signal into an electronic data.

In certain embodiments, the system is integrated into a handheld device that both measures the desired physical and/or chemical quantities and performs the desired calculations.

Figure 4:
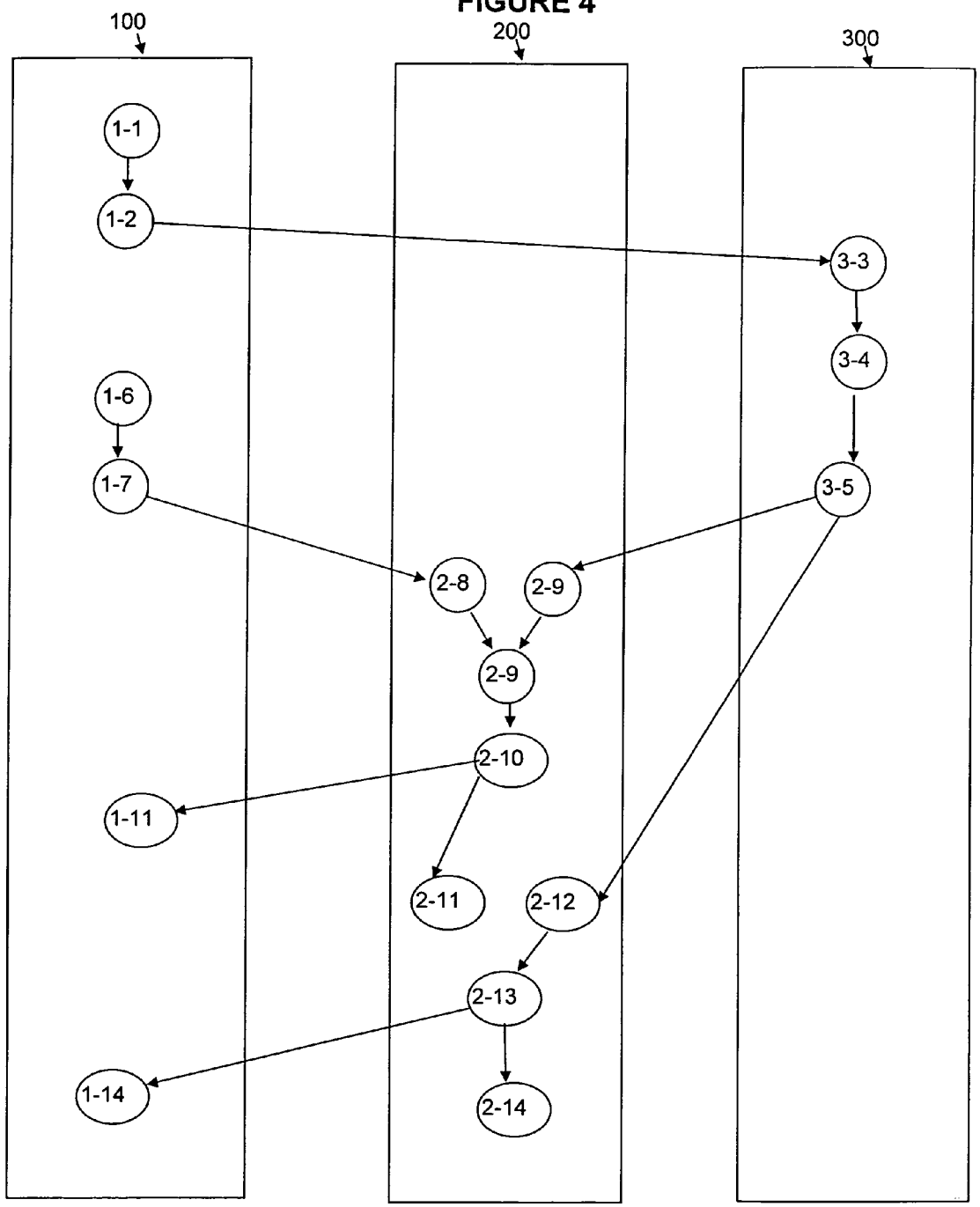
FIG. 4 shows a flow diagram of the method according to an embodiment of the invention.

Turning to FIG. 4, shown is a flow diagram of a method according to a preferred embodiment of the invention wherein the method is performed using a measuring device 100, such as a baby bottle equipped with a pressure sensor for monitoring pressure inside the bottle, analog-digital converter, a microcontroller, a flash memory chip, and an electronic display; a computer system 200 comprising a microprocessor, data interface, an electronic display; and a computerized database 300. The steps of FIG. 4 are provided in Table A. The method can involve steps 1-10, 2-10, or both, depending on the desired output form. Likewise, the method can involve 1-15, 2-15, or both, depending on the desired output form. In addition, steps 3-11, 2-12, 2-13, 2-14, 1-15, and 2-15 are optional.

TABLE A

| Step No. | MEASURING DEVICE | COMPUTER SYSTEM | METRIC DATA BASE |
|---|---|---|---|
| 1-1 | measure feeding factor physical quantities for a population-based sample of infants | | |
| 1-2 | convert physical quantities into digital data | | |
| 3-3 | | | receive digital data/calculate feeding parameter values for sample of infants; receive medically relevant outcome data for sample of infants; receive subjective characteristic data for sample of infants |
| 3-4 | | | Assemble feeding parameter and/or risk outcome metrics |
| 3-5 | | | perform referencing and/or statistical operations |
| 1-6 | measure feeding factor physical quantities for an individual infant | | |
| 1-7 | convert physical quantities into digital data | | |
| 2-8 | | receive digital data/calculate feeding parameter values for individual infant | |
| 2-9 | | receive feeding parameter metric from database | |
| 2-10 | | correspond feeding parameter value for individual infant to the feeding parameter metric to render a referenced feeding score for the individual infant | |
| 2-11 | | display the referenced feeding score as a user recognizable output | |
| 1-11 | display the referenced feeding score as user recognizable output | | |
| 2-12 | | receive risk outcome metric | |
| 2-13 | | correspond feed parameter values for individual infant to the risk outcome metric to produce an | |

TABLE A-continued

| Step No. | MEASURING DEVICE | COMPUTER SYSTEM | METRIC DATA BASE |
|---|---|---|---|
| 2-14 | | referenced risk outcome score for the individual infant<br>display referenced risk outcome score as a user recognizable output | |
| 1-14 | display the referenced risk outcome score as a user recognizable output | | |

EXAMPLES

The following examples demonstrate certain preferred embodiments of the invention.

Applicants have found: (1) that infant feeding performance corresponds to the maturational status of the underlying neurological mechanisms (i.e., varying on average as a function of GA at birth but with substantial variability across individual infants of the same birth GA), (2) that feeding parameter metrics for pre-term and full-term neonates are related to a variety of medical conditions, including abnormal nutritional intake, and (3) that feeding performance scores of individual pre-term neonates is a prognostic indicator of adverse outcomes, including risk for mental and psychomotor delays that emerge by the end of the first year of life.

The following examples demonstrate certain preferred methods for quantitatively assessing developmental risks of a neonate based upon objective observations of the neonate's sucking behavior and a statistical correlation between this observed behavior and a standard. The methods in these examples involve providing a neonate with a baby bottle; measuring negative sucking pressure, and optionally flow volume, produced by the neonate's sucking behavior, (e.g., the pressure differential generated across a nipple and changes in the pressure differential as a function of time); using the measurements to derive feeding parameters; compiling these feeding parameters and/or referenced feeding scores derived therefrom, into a composite feeding score for the neonate; and corresponding the neonate's individual composite feeding score pattern to one or more medically relevant outcome metrics. In practicing this method, the comparison of the neonate's composite feeding score with a metric will suggest a risk of abnormal development if the neonate's individual score pattern deviates more than a predefined range from the standard score pattern.

Also demonstrated is a method for correlating the characteristics of feeding organization in a pre-term neonate to developmental status assessed at 6 months, and one year later. Accordingly, such methods can be used to assess the risk of subsequent abnormal mental or psychomotor development in a neonate by correlating a neonate's individual feeding parameter score pattern to metrics derived from a population-based sample. Preferably, the method involves the steps of analyzing of the pattern of sucking in pre-term neonates (shortly after birth and at 40-wk Post Menstrual Age (PMA)), and evaluating the correlation between individual infant differences in the organization of sucking behavior in the neonatal period and neuro-developmental outcome metrics acquired at 12-months of age using a standard screening instrument such as the Bayley Scales of Infant Development (BSID).

The methods described herein can also detect underdeveloped feeding organization in full-term neonates. Clinical experience has shown that many full-term neonates are less likely to suckle on the first day, as compared to the second day of life. Issues associated with feeding performance in the neonate are relevant to discharge decision and the discharge plan, can elevate maternal concerns about adequate care and nourishment, can increase non-routine physician visits and the need for feeding therapeutic intervention. The factors that underlie the development of feeding skills are not well-understood. Full-term neonates are often described as being sleepy during the first day of life, which has been associated with decreased feeding activities. This lack of robust alert state, however, does not take into account maturation and/or experience associated with feeding which may contribute to the more robust feeding patterns generated by a neonate by the second day of life.

The apparatus for measuring feeding factors for these examples comprises a baby bottle, a nipple disposed on one end of the bottle, a pressure transducer in operative communication with the nipple to measure negative pressures applied by the neonate inside the bottle; and a data processing device to process said measurements.

The feeding parameters in these examples are primarily derived from a measurement of fluid flow through, and/or pressure on one side of, and/or pressure differential across, a nipple or some other feeding device during a time interval or as a function of time over a time interval, wherein the flow, pressure, or pressure differential is generated by a neonate's mouth when feeding himself or herself or attempting to feed himself or herself. Data derived from pressure differential variations that are produced by a sucking neonate can be recorded as, for example, sucking pressure, duration of a suck cycle, rhythmicity of a series of sucks, intermittent bursts of sucks, pauses between sucks, and the like. More specifically, data may be derived from a continuous electrical signal produced by a pressure transducer that records the vacuum applied by a neonate against an artificial nipple during a series of suck cycles (i.e., individual sucks made by the neonate against the nipple). Fluctuations in the signal over various periods of time can be analyzed, for example by a computer running on-line or off-line, to generate parameters such as time of occurrence of the pressure peak for each suck cycle; amplitude of the pressure peak ("Pmax") for each suck cycle; area under the curve (trough-to-trough) for each suck cycle; and duration of each suck cycle (trough-to-trough).

From one or more of the above, the following parameters or parameter categories may be generated for one or more observation intervals of interest within a given feeding test session (e.g., a 5 minute feeding session): total number of sucks and suck rate (=number of sucks/observation interval duration); mean maximum sucking pressure; statistical distribution parameters for Pmax including the standard deviation (SD) and coefficient of variation (CV=SD/mean); statistical distribution parameters for inter-suck-intervals (ISI) (i.e., the time (sec) between one sucking peak and the next peak).

Data may be further parsed in relation to the succession of bursts and pauses between bursts within the observation interval. For most applications, ISI $\geq 2$ seconds is given as the criterion that defines the end of one sucking burst and the beginning of the next. A burst, then, may be defined as a continuous succession of suck cycles with ISI's all <2 seconds. Other parameters that may be derived include number of bursts, number of pauses, mean pause duration, mean burst duration, mean number of sucks per burst, statistical distribution parameters for ISI within bursts including mean ISI (and its reciprocal, the within-burst suck frequency), and statistical distribution parameters for Pmax within bursts, including mean, SD and CV.

Moreover, a comprehensive profile of the sucking test session may entail computation of all parameters above for each of several observation intervals, such as the test session as a whole (defined as the time between the first and last suck cycles of the session) or the first defined portion of the test session; each successive minute within the session; and each successive fraction of the test session as a whole. For certain examples, the session may be divided into predefined epochs such as, for example, halves, thirds, quarters, or fifths. High-order analyses of trends, such as those accomplished via analysis of variance, regression or multiple regression techniques, may also be conducted on certain parameters to ascertain or characterize changes across successive temporally-defined segments of the test session as a whole.

Applicants have found that individual feeding parameters, such as for example the total number of sucks emitted during a 5-minute test session, the average number of sucks per burst emitted during the session, and the session-average negative peak pressure for sucking cycles within a session, are useful in assessing potential developmental problems for the infant.

For example, a neonate's feeding organization can be assessed by determining a value for one or more of these parameters and then using such values to develop an individual feeding organization score pattern. Comparison of the individual score pattern to a standard feeding organization score pattern range which are referenced against feeding metrics composed within appropriate population-based samples, is useful in determining whether the neonate possesses abnormal sucking behavior which, in turn, can demonstrate a present or future developmental problem.

Certain medically relevant feeding parameter metrics are composed in these examples. In one example, an analysis of nutritive sucking maturation is derived from samples of neonates born at different gestational ages—from the most premature neonates from whom sucking bouts can be reliably elicited and recorded (GA=33 weeks), to neonates born full-term (GA=40 weeks). In another example, a population-based sample of pre-term neonates is tested to determine their individual feeding parameter scores from tests delivered at chosen later gestational ages. The mental and psychomotor development of the same infants in the evaluated population sample is assessed at 6- and 12-months corrected gestational age via the Psychomotor Developmental Index (PDI) and Mental Developmental Index (MDI) subscales of the Bayley Scales of Infant Development (BSID). Using a multiple regression model, the individual neonatal feeding parameter scores are correlated with the PDI and MDI outcomes, thereby showing the referenced parameter scores to be a useful indicator of future mental and psychomotor developmental outcomes.

The Bayley Scales of Infant Development (BSID-II), yields two distinct indices reflecting, respectively, mental development (MDI) and degree of control of body coordination and fine motor skills (Psychomotor Developmental Index—PDI). The Bayley Scales have been used widely since 1958 and remain one of the most accurate and sensitive ways to measure infant development. The BSID were standardized on 1262 children ranging in age from 2 to 30 months. The standardization sample was stratified to control for sex, race, socioeconomic status, and urban vs. rural home. The validity of the Bayley scales is supported by the correspondence between scores on the Bayley Mental Scale and the Stanford-Binet Intelligence Scale. Internal consistency and reliability of the MDI and the PDI scales range from 0.68 to 0.93. Test-retest reliability was 0.76. The BSID-II was administered by a developmental psychologist to infants at 6 and/or 12 months Corrected Gestational Age (CGA). These subscale scores were normed to have a mean of 100, with higher scores indicating greater levels of development.

Example 1

This example involves a method for assessing a neonate's risk of subsequent abnormal mental and psychomotor development using a neonate's individual referenced feeding parameter scores.

The study sample consisted of 105 neonates. The mean GA at birth for the overall sample was 30.19 weeks (range=28 to 34), with mean birth-weight of 1456 grams, and mean length of hospital stay of 42 days. The mean maternal age was 28.3, with over 42% of mothers having completed some level of college education, 36% with high school diploma, and the remaining 26% with less than a high school education. The neonates were predominantly African-American (63%) and approximately half (49.6%) were female.

The feeding performance assessment was based on a 5-minute test initiated 30 minutes prior to the second scheduled feeding of the day. A modified Kron nutritive sucking apparatus used to derive three feeding parameters: the number of sucks emitted during the session, the average number of sucks per burst, and the average negative peak for suck cycles within the session. In addition, a referenced composite feeding score was generated, as the average z-score for the three parameters, referenced against the respective parameter metrics for this population-based sample. Developmental outcomes were given as MDI and PDI subscales of the BSID assessment delivered when the infants were 6 months CGA (N=96) and 12 months CGA (N=63).

Statistical analyses were conducted with Stata (version 8) and SPSS (version 12) software using two sided tests and a p-value <0.05 as the criterion for statistical significance. Initial analyses were descriptive and included computing means, medians, and standard deviations of continuous parameter metrics, and frequency distributions of categorical variables. Linear regression was used to explore the relationship between individual feeding parameters and the respective MDI and PDI outcomes. The fit of the regression models was assessed via R-squared and model assumptions for the regression models were assessed via appropriate plots and statistical tests.

Outcomes for this sample included MDI and PDI values at 6 and 12 months that were significantly below the normative means of 100 for full-term neonates, consistent with published results from national and international studies assessing the developmental consequences of premature delivery. At 6 months CGA, mean PDI was 84.6±10.8 (SD) (95% confidence interval [CI]; 81.0, 88.3), and mean PDI was 89.01±10,8 (CI; 86.8, 91.2). At 12 months CGA, mean PDI was 88.4+16,7 (CI; 84.3, 92.6), and mean MDI was 90.2+13.2 (CI; 87.5, 94.1).

For all feeding parameter metrics, there was a significant increase in values between the sessions run at 34 and 40 weeks GA. These changes, indicative of maturation of feeding organization, were expected, and in agreement with results reported elsewhere.

The strength of association between feeding parameter metrics and outcomes varied depending on the time of the feeding test (34 weeks or 40 weeks PMA), and when (6 or 12 months CGA) the BSID was administered. Pairwise correlations among the three feeding parameters were significant for both the 34- and 40-week feeding tests. For both tests, these three parameters, as well as the composite parameter ("Suck Maturity Index", SMI), were each significantly associated with the respective 12-month outcome scores, with one exception (34-week Pmax not correlated with PDI or MDI at 12 months CGA). By contrast, no feeding parameter was correlated with BSID outcomes from the 6-month assessment. The SMI was chosen for subsequent analyses for simplicity of presentation, and for the statistical advantages of representing a single (representative) feeding parameter in multivariable models.

A GEE models treating BSID outcomes (MDI and PDI) concurrently provide a concise account of the predictive value of SMI alone, and when other subject variables were included. As expected, the associations between MDI and PDI values were significant (for the 12-month outcome, $r^2=0.58$, $p<0.0005$).

An initial GEE analysis showed a significant relationship between SMI from the 40-week feeding test and BSID outcomes; an included interaction term to determine [SMI×outcome type] was not significant, indicating that the impact of feeding did not differ according to whether the outcome was MDI or PDI. With the interaction term removed, an expected increase in outcome (MDI or PDI) of 9.53 was associated with a 1-unit (SD) increase in feeding score (95% confidence interval=[4.65, 14.41], $p<0.0005$). This result appears to be of clinical significance insofar as the average BSID values for these infants fell significantly below the full-term norms to begin with. Importantly 40-week SMI was still significantly associated with 12-month outcomes after adjustment for additional covariates. SMI, in fact, was the only significant correlate when all potential predictors were included. For example, GA at birth and length of hospital stay, were each correlated with 12-month MDI and with PDI, but neither were associated with the outcomes in the inclusive GEE model (PMA: $p=0.74$; length of stay; $p=0.15$).

Clinical utility was further indicated by the GEE logistic model, where 40-week SMI was a significant predictor of whether an infant's 12-month PDI or MDI values would fall in the lowest 10% of the sample (here, with at least one subscale value below 70) [($p<0.015$; odds ratio=0.22; 95% CI=0.07, 0.74). Thus, the lowest referenced SMI scores were indeed associated with the most pronounced risk for neurodevelopmental delays.

SMI for the 34 week feeding test was also associated with BSID outcomes at 12 months when considered alone, as consistent with the univariate regression results described above. However in the inclusive GEE model, correcting for the effects of other subject variables (including all or combinations among:: gender, mother's education level, ethnicity, race, GA at birth, birth weight, maternal age, and length of hospital stay and other potential predictors), the relationship between 34-week SMI and developmental outcomes was no longer significant. A stronger (positive)t result may be obtained with the added statistical power associated with a larger population-based sample than that of the present study, but the working suggestion from the described example is that later testing times (in a range including the 40 weeks GA example) may provide enhanced prognostic power of neonatal feeding performance analysis with respect to risk for developmental delays that emerge by the end of the first year of life.

Example 2

This example illustrates a method for determining abnormal feeding organization in preterm neonates and shows that different aspects of the sucking pattern mature at different GAs and are of relevance to neurobehavioral development.

One hundred and eighty-six neonates with GA between 33 and full-term (38-42 weeks) were studied. All infants were free from congenital anomalies, with birth weights within the normal for GA at birth. At the time of testing, the neonates were free of medical complications, breathing room air, in open cribs and medically stable. Neonates were assigned to the following groups; GA 33 weeks (N=40), GA 34 weeks (N=39), GA 35 weeks (N=40), GA 36 (N=16), GA 37 (N=21), and full-term (GA range=38-42 weeks, mean=39.49±1.01; n=30). The full-term neonates were designated as 40 weeks for analysis purposes. There were an equal number of males and females in all of the GA groups. There were no significant differences in Apgar scores at 1 or 5 minutes, or maternal age between groups. As expected with increasing GA at birth, there were highly significant differences (ANOVA: F=70.95; $p<0.001$) in birth weights, with significant pair-wise differences ($p<0.001$) except between 33-34 GA groups.

Neonates with GA at birth of 33 and 34 weeks completed the protocol during the first week of life. Neonates greater than or equal to 35 weeks gestation at birth were assessed during the second day of life. The feeding measurements were obtained one half-hour prior to a scheduled morning feeding. In the transitional care nursery all feeding assessments were pre-scheduled with the neonate's primary nurse. In the full-term nursery, feeding assessments took place in the nursery prior to the first early morning feeding after newborn rounds were completed by the nursing and medical staff. One half-hour prior to a scheduled feeding is a preferred testing time, when neonates could be brought to the optimal quiet, alert state. Pre-term neonates were fed their prescribed formula or breast milk. Full-term neonates were all bottle-fed and given standard nursery formula.

The tests involved the use of a Kron nutritive sucking apparatus similar to that described above. Customized software generated a set of sucking parameters including: number of sucks per session, sucking duration (interval from first to last suck in session), number of bursts in session (a two-second pause defined separation of bursts), mean burst duration, total burst time as percent of session, within-burst suck frequency, mean maximum sucking pressure ($P_{max}$), the coefficient of variation (sd/mean) of the within-burst inter-suck interval distribution, and the coefficient of variation of the $P_{max}$ distribution for all sucks in the session. In addition, changes in the sucking pattern over time within the session were characterized. For this purpose, the sucking bout was divided into five parts (epochs).

For each of the session summary parameters, one-way analysis of variance (ANOVA) was used to test the hypothesis that that feeding performance varies as a function of GA at birth. Linear regression was used to model trends in the summary session parameters across gestational age. A two-way ANOVA was used to simultaneously characterize the effects of gestational age (between-subjects) and epoch within session (within-subject). Normality assumptions required for the one- and two-way ANOVAs and linear regressions were verified. Transformations were applied for some of the session summary parameters (e.g. Logit transformation used for percentages as outcome such as bursting as percent of session duration and log transformation used for counts such as number of bursts). In each of these cases, however, no differences were detected in the model results. For simplicity of presentation, therefore, all models are presented on the untransformed scales.

Neonates of greater GA emitted more sucks per session. Sucking duration did not vary significantly with GA. Total burst time grew as a percentage of the meal, increasing from 40.5% of the sucking bout for 33 week-old neonates to 61.3% for full term neonates. This increase was due to a substantial increase in the duration of sucking bursts. The number of bursts emitted in fact decreased with GA. Within-burst suck frequency did not vary with GA, but a significant decrease with GA in the coefficient of variation (SD/mean) of the within-burst intersuck interval distribution was obtained. Mean maximum sucking pressure ($P_{max}$) increased and the variability about the mean (i.e., coefficient of variation for the session $P_{max}$ distribution) decreased as functions of GA.

Parameters that varied significantly with GA differed with respect to when, across the range evaluated, the greatest changes occurred. For number of sucks, bursts as percent of meal, burst duration and mean pressure maximum, post hoc analyses revealed significant changes between GA 36/37 and GA 40, with no indication of change over the 33-35 week GA range. A contrasting profile was obtained for three other parameters, (coefficient of variation for the inter-suck interval distribution, coefficient of variation for $P_{max}$, and the number of sucking bursts. For these three, there were no significant changes over the 35 to 40 week GA range. The largest change in mean values occurred between 34 and 35 weeks GA, although significant pair-wise comparisons were obtained only between GA 33/34 and GA 40.

A number of changes in the sucking pattern over the course of individual test sessions were obtained, as assessed by 2-way [epoch within session×GA] ANOVA. Within-burst suck frequency did not vary across epochs, but significant changes over the 5 epochs of the sucking bout were obtained for: number of sucks, number of bursts, mean burst duration, total burst time as percent of epoch, mean maximum sucking pressure, and for total burst time as percent of epoch (pattern mirroring that for number of sucks). A significant main effect of GA was obtained for each parameter evaluated except for within-burst suck frequency; the results for these parameters at the epoch and whole-session levels were thereby in good agreement. There were no 2-factor interactions except for one parameter—mean burst duration. For this parameter, the epoch curves for each GA were similar to the group curve, but with a somewhat flatter profile over epochs 2 to 4 for some GAs than for others and with somewhat less of a rebound from epoch 4 to 5 for GA 37 weeks than for the other neonates.

In this example, the changes in the pattern of nutritive sucking behavior as a function of gestational age (GA) in healthy neonates were described. A systematic pattern of GA-related change in sucking behavior is reflected at each level of temporal analysis (whole-session, burst-to-burst, and within sucking bursts).

Significant changes as a function of GA were observed for six of the nine session-summary parameters evaluated. For four of these parameters that changed (number of sucks per session, burst time as percent of bout, duration of sucking bursts, and mean maximum sucking pressure), the transitions were not seen across the earliest GA (33-35 weeks), but rather between 36/37 and 40 weeks GA. Note, however, that neonates at 33 and 34 weeks GA may have benefited in that they were tested later in the first week, rather than on the second day, of life. The later testing was necessary because the most premature neonates do not feed reliably, if at all, on the first and second postnatal days. The lower probability of successful feeding in this younger group is itself an indicator of a more immature feeding system than is evidenced by neonates of greater GA. The sucking pattern observed in the most premature neonates in this study, then, probably reflects the contribution of postnatal maturation of the sucking apparatus and/or the benefit of earlier postnatal sucking experience.

Significant changes in these four parameters between 36 and 40 weeks GA was a reliable finding in neonates that were tested according to identical protocols. This is an important result from the clinical perspective, in that neonates 36-37 weeks GA (or younger) are often regarded as "full-term equivalents", and therefore are expected to feed as effectively as full-term neonates. The present data provide a counterpoint to this perspective, suggesting that despite the absence of other health concerns, the maturity of the sucking mechanism in neonates of younger GA can be called into question.

The organization of sucking within bursts presented a more complex developmental profile. One parameter, the within-burst suck frequency, did not vary with GA, suggesting that this basic aspect of patterned sucking behavior was in already place in the most premature neonates. This result may be contrasted with that of a longitudinal study of non-nutritive sucking in premature neonates. The contrasting results may relate to methodological differences [e.g., nutritive vs. non-nutritive fluids] or to different degrees of postnatal feeding experience before testing.

Another parameter, $P_{max}$, was among the four parameters discussed above for which the developmental transition occurred at a later point; in this case, between 37 and 40 weeks GA.

The transition for two other within-burst parameters, however, appeared to occur at an earlier GA. Both concern moment to-moment variability in sucking behavior. Despite the relative stability in the mean sucking frequency, the variability about the mean (re: coefficient of variation of within-burst inter-suck interval distribution) decreased with GA, with the transition occurring between 34-35 weeks. Similarly, despite the relative stability of mean sucking pressure over this GA time frame, the variability about that mean significantly decreased between 34 and 35 weeks, with no significant change thereafter. However, the postnatal testing point for neonates at GA 33 and 34 weeks is later than for those at GA 35 weeks and greater. This disparity is not regarded as a potential confound for our suggestion of the early transition in these measures of variability of the sucking pattern. The greater age and feeding experience in the most premature neonates is expected to reduce response variability, thereby muting the differences between these (33/34 GA) and neonates of greater GA. Sucking response variability, then, appears to represent a valid correlate of an early transition in the organization of the sucking pattern.

Significant changes from the first to fifth epochs (i.e., about the first and fifth minute of the five-minute test) of the sucking bout were obtained for number of sucks, number of bursts, burst duration and $P_{max}$. Of the five parameters evaluated over epochs, only within-burst suck frequency did not change as the session progressed. Values declined over the first 4 epochs for number of sucks, burst duration and $P_{max}$. A recovery from epoch 4 to 5 was observed for sucks, burst duration and number of bursts, with values for these measures approaching or exceeding those obtained during the first epoch. Episodic increases in feeding vigor at later stages of a neonate feed have been noted in studies of breast feeding. It would have been expected that such periods of increased sucking would have appeared at random points from feeding onset. It is surprising, therefore, to see reliable increases at a consistent point from feeding onset that, moreover, held up across GA.

In the analysis of the epoch data, it was found, as expected, significant effects of GA on the same parameters (number of sucks, burst duration, burst number and $P_{max}$) that also varied when evaluated at the whole-session level. One might expect that the pattern of change over epochs would be different for the neonates of earlier versus later GA; for example, the most premature neonates might have experienced fatigued earlier in the session or shown a flatter overall profile given lower intakes in the earliest portion of the observation interval. No notable two-factor (GA×epoch) interactions, however, were obtained. That the within-session changes in the sucking pattern occurred independently of GA suggests that those factors underlying the temporal organization of the feed, under the present testing conditions, are in place at a relatively early point in gestational development. The mechanism underlying the changes in sucking as meals progress remains an open issue, as the relevance and relative contribution of such factors as satiation, stimulus habituation, and fatigue, have yet to be systematically evaluated in neonates.

In this example, a set of linked population-based samples was constructed, where statistical relationships between corresponding feeding parameter metrics were statistically evaluated. Notwithstanding the significant overall trends, there was, as expected, significant variability about each mean parameter metric value. Individual referenced parameter scores, then, specify its relative position the distribution of metric values. A particularly low score, e.g., one falling in the lowest $10^{th}$ percentile, can be taken as an indication of an abnormally low maturational status of neural mechanisms controlling feeding organization. In this case, a contemporary medical condition and/or increased risk for adverse medically relevant outcomes may be suspected, formal assessment of which would entail risk outcome scores referenced against population-based samples containing relevant outcome metrics.

Example 3

This Example illustrates a method for diagnosing abnormal feeding organization in full-term neonates.

Fifty-six full-term neonates, received 5-minute feeding tests after 10 hours of age on and during the second day of life. Physical examinations were completed as per nursery routine. The feeding measurements were obtained using a Kron nutritive sucking apparatus one half-hour before the neonates were to be returned to the mother (approximately 9:30 a.m.). The neonate was lightly wrapped in one blanket and held by the researcher throughout the protocol. The 5-minute feeding session was preceded and followed by five minute periods during the first and fifth minutes of which state assessments were performed.

Customized software generated a set of feeding parameters including: number of sucks, number of bursts, average number of sucks per burst, average interburst pause duration, suck width (length suck cycle), and $P_{MAX}$. In addition, infant behavioral state was evaluated using The Anderson Behavioral State Scale (ABSS), The full 12 item scale was used to assess infant behavioral state before and after feeding assessment. State data was not collected during the feeding session. The behavioral states were assessed as follows: 1=regular quiet sleep, 2=irregular quiet sleep, 3=active sleep, 4=very active sleep, 5=drowsy, 6=alert inactivity, 7=quiet awake, 8=active, 9=very active; 10=fussing, 11=crying, and 12=hard crying. The highest score within a 30 second period was taken. The twelve behavioral states were collapsed into 3 groups for the certain analyses: state 1=sleeping, state 2=awake, and state 3=crying. Inter-rater reliability for the two nurse researchers was established (r=0.95).

Results were analyzed using the Geneleral Estimating Equations (GEE) model. The model does not require specified correlation structures between measurements and across conditions of interest. The correlation structure, rather, is left unspecified and estimated via the data for these analyses.

Based on the original 12-state scale, neonates were more awake on the Day 2 vs. Day 1 assessment as seen in differences in the 1-minute state (6.55±3.06 vs. 8.17±3.48, p<0.01) (95% CI, -2.89). When the twelve behavioral states were collapsed into 3 groups for the regression analysis: state 1=sleeping, state 2=awake, and state 3=crying, the Day 2-Day 1 difference was shown to be highly significant.

Feeding parameters that varied systematically from the first to second day of life were the number of sucks generated over the feeding session, interburst width and intersuck width. The changes were independent of the number of hours after birth and the amount of feeding experience. There were indeed significant differences in sucking patterns related to the various behavioral states, as demonstrated by the increase in sucks generated by neonates who began the feeding session crying versus those neonates who were in a sleep or quiet awake state. In addition, the amount of time spent bursting was also affected by behavioral state. In this case, there were significant differences across the feeding session for neonates that began the session in a sleep state as compared to those neonates who were either awake or crying.

Nevertheless, there were changes in the sucking pattern over days that were independent of behavioral state. Correcting for state, the GEE analysis revealed significant changes from the first to the second day for number of sucks, pauses between sucking bursts, and Pmax. These findings confirm, for this population-based sample of neonates, the clinical impression that neonate feeding does change over the first days of life and, moreover, demonstrate state-independent increases in feeding performance which may reflect neurologic maturation and/or the benefits of feeding experience over this period.

Findings from this study suggest that feeding or sucking patterns may serve as an index of maturation and should be taken into account during hospitalization, as brief as it may be, and during the first days of life. With few objective measures to evaluate the well-being of a neonate after only 24 hours of life, feeding patterns may help fill the gap. Sucking pattern analysis may yield objective, reliable and cost-effective assessment tools. Extremely poor feeding skills on the first day of life may be a criterion for postponing early discharge.

Although adequate feeding skills are necessary for survival, level of feeding performance for most full-term neonates is not fully evaluated before hospital discharge, usually within the first 24 to 48 hours of life. With few objective criteria for assessing their progress in the hospital and little or no organized home follow-up evaluation, poor feeding capacity may go undetected until related problems become manifest in the days or weeks after discharge.

Having thus described a few particular embodiments of the invention, various alterations, modifications, and improvements will readily occur to those skilled in the art. Such alterations, modifications, and improvements, as are made obvious by this disclosure, are intended to be part of this description though not expressly stated herein, and are intended to be within the spirit and scope of the invention. Accordingly, the foregoing description is by way of example only, and not limiting.

What claimed is:

1. A computational method for generating a feeding score for an individual infant indicative of feeding performance comprising the following steps:
   a) receiving digitized data corresponding to two or more feeding factor measurements obtained from the individual infant, wherein said feeding factor measurements are indicative of physical, physiological, or behavioral responses produced during at least one feeding session for the individual infant;
   b) providing at least one feeding parameter relating said two or more feeding factor measurements, and calculating, for said at least one feeding parameter, a value based on said two or more feeding factor measurements;
   c) providing a set of feeding parameter metrics comprising at least one distribution of values derived from feeding sessions of a population of infants having a similar gestational age as the individual infant;
   d) comparing the value for said at least one feeding parameter with the set of feeding parameter metrics and deriving a referenced feeding score for the individual infant relative to the set of feeding parameter metrics;
   e) outputting the referenced feeding score to a user as a percentile or a percentile range within the at least one distribution of values comprising the feeding parameter metrics, wherein said referenced feeding score represents the feeding performance of the individual infant, and wherein steps a) through e) are performed on a suitably programmed computer.

2. The method of claim 1, wherein said feeding parameter is derived by performing at least one statistical operation on an aggregation of a feeding factor event and at least one additional feature related to the feeding factor event.

3. The method of claim 2, wherein said feeding parameter is selected from the group consisting of a time of a number of sucks, average pressure peaks for all suck events, an average number of sucks per sucking burst, a total burst time as a percentage of an observation interval, a mean variance and a coefficient of variation of time intervals between sucking pressure peak and peak inspiration, and a breathing rate during sucking bursts.

* * * * *

UNITED STATES PATENT AND TRADEMARK OFFICE
CERTIFICATE OF CORRECTION

PATENT NO. : 8,473,219 B2  
APPLICATION NO. : 12/595755  
DATED : June 25, 2013  
INVENTOR(S) : Joel Kaplan, Jay N. Zemel and Barbara Medoff-Cooper It is certified that error appears in the above-identified patent and that said Letters Patent is hereby corrected as shown below:

In the Specification:

Column 1, line 11, please insert the following:

--STATEMENT REGARDING FEDERALLY SPONSORED RESEARCH

This invention was made with government support under grant number NR002093 awarded by National Institute of Health. The government has certain rights in the invention--.

Signed and Sealed this  
Twenty-ninth Day of April, 2014

Michelle K. Lee  
*Deputy Director of the United States Patent and Trademark Office*